United States Patent [19]

Iwasaki et al.

[11] Patent Number: 4,644,215
[45] Date of Patent: Feb. 17, 1987

[54] PIEZOELECTRIC VIBRATION MEASUREMENT HEAD

[75] Inventors: Takashi Iwasaki; Keiji Mori, both of Odawara, Japan

[73] Assignee: Fuji Photo Film Co., Ltd., Japan

[21] Appl. No.: 775,319

[22] Filed: Sep. 11, 1985

[30] Foreign Application Priority Data

Oct. 17, 1984 [JP] Japan ................................ 59-217946

[51] Int. Cl.⁴ ............................................. H01L 41/08
[52] U.S. Cl. ..................................... 310/367; 360/77; 73/DIG. 4
[58] Field of Search ............................... 310/330-332, 310/367-369; 360/77, 78, 109, DIG. 1; 73/632, DIG. 1, DIG. 4

[56] References Cited

U.S. PATENT DOCUMENTS

| | | | |
|---|---|---|---|
| 1,737,253 | 11/1929 | Linsell | 310/368 X |
| 1,802,782 | 4/1931 | Sawyer | 310/367 X |
| 3,531,742 | 9/1970 | Saito et al. | 310/367 X |
| 4,099,211 | 7/1978 | Hathaway | 360/77 X |

Primary Examiner—Mark O. Budd
Attorney, Agent, or Firm—Pasquale A. Razzano

[57] ABSTRACT

A vibration measurement head is used to measure the type of vibration set up in a magnetic head by the frictional contact of the magnetic head with magnetic media. The head is the same shape as such a magnetic head and consists of piezoelectric material in which vibration generates an electrical charge. This charge is measured, thereby providing a simulated measurement of the vibration occuring in a magnetic head.

1 Claim, 2 Drawing Figures

PIEZOELECTRIC VIBRATION MEASUREMENT HEAD

BACKGROUND OF THE INVENTION

1. Field of the Invention

This invention relates to a head used to measure vibration produced in a magnetic head by sliding contact with a magnetic recording medium.

2. Description of the Prior Art

Systems have been developed and are in practical use wherein a magnetic head is brought into sliding contact with various magnetic recording media for the recording therein and reproduction therefrom of information. In one such recording reproduction system employed in a helical scanning type videotape recorder, a magnetic head mounted on a rotating cylinder is spun at high speed, by the rotation of the cylinder, in sliding contact with the magnetic recording media. The considerable complexity of this type of magnetic recording/reproduction system makes it difficult to carry out various inspection and test procedures, so in many cases the characteristics thereof are not known in detail. Of particular importance is measurement of the vibration produced in the head by the friction set up between the head and the magnetic recording medium and various analyses on the basis of the measured values, and as such there is a need for a means of measuring head vibration with ease and accuracy.

SUMMARY OF THE INVENTION

In view of the above need, it is a primary object of the present invention to provide a head vibration measurement device which is able to provide a simulation-type measurement of vibration produced in a head by the sliding contact between the head and the recording medium, and which can easily and accurately detect head vibration even in complex magnetic recording/reproduction systems.

DETAILED DESCRIPTION OF THE INVENTION

The vibration measurement head according to the present invention is characterized by being provided with a pair of electrodes on a piezoelectric element almost identical in shape to a magnetic head. Specifically, by locating this vibration measurement head in the same or similar position as the magnetic head and having it in sliding contact with the magnetic recording medium, vibration is produced which is virtually the same as that produced in the magnetic head and a piezoelectric charge is produced on the basis of this vibration, and the piezoelectric effect charge, which corresponds to the vibration, can be measured by connecting a voltmeter to the electrodes.

Figure 1:
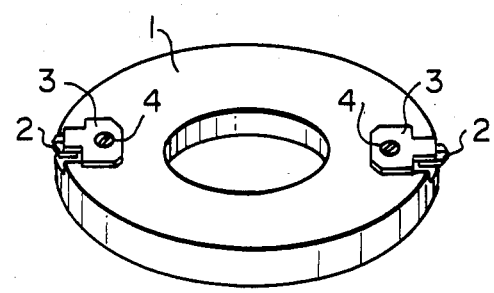
FIG. 1 is a perspective view showing a magnetic head mounted on a rotary cylinder.
Figure 2:
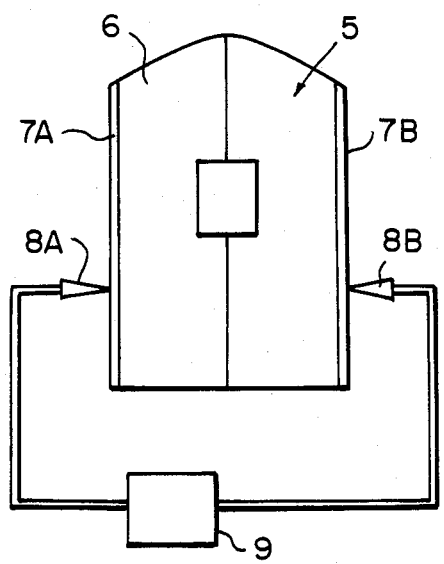
FIG. 2 is a overall explanatory view illustrating simulated measurement of magnetic head vibration by means of one embodiment of the vibration measurement head according to the present invention.

With reference to FIG. 1, a pair of magnetic heads 2 are mounted on a rotary cylinder 1. Each of the magnetic heads 2 is held in place by supports 3, said supports 3 being affixed to the rotary cylinder 1 by means of screws 4. The rotation of the cylinder 1 causes the magnetic heads 2 to spin at high speed in sliding contact with the magnetic tape or other such magnetic recording medium for recording/reproduction of image and other such imformation. The friction generated by the sliding contact of the magnetic heads 2 with the magnetic medium produces vibration in the head. The method of simulated measurement of this magnetic head vibration by means of the vibration measurement head of this invention will now be described with reference to FIG. 2.

To measure the vibration produced in the head a vibration measurement head 5 of the same form as the magnetic head is mounted on the cylinder 1 at the same or equivalent mounting location as the magnetic head so as to be subjected to the same kind of sliding contact with the magnetic medium that the magetic head is subjected to. The vibration measurement head 5 is comprised of piezoelectric element 6, with electrodes 7A, 7B provided on the sides of the piezoelectric element 6 perpendicular to the surface which is in sliding contact with the magnetic medium. This sliding contact with the magnetic medium produces in the vibration measurement head the same type of vibration that is produced in the magnetic head. This vibration gives rise to a piezoelectric charge in the piezoelectric element 6 which corresponds to the amount of vibration. This charge can be measured by applying the probes 8A, 8B of the voltmeter to the electrodes 7A, 7B. Therefore, this vibration measurement head makes it possible to simulate the measurement of magnetic head vibration in the form of a voltage. By carrying out analyses on the basis of the data obtained by such measurement, it is possible to elucidate various characteristics relating to the sliding motion of magnetic heads against tape.

The electrodes 7A, 7B provided on the piezoelectric element do not have to be positioned as shown in this embodiment, but may be located in any desired position on the piezoelectric element where the piezoelectric charge can be measured. Also, although in this embodiment the probes 8A, 8B are shown in direct contact with the electrodes 7A, 7B, leads may instead be connected to the electrodes and led out of the head for connection to the probes.

As described in the foregoing, the vibration measurement head according to the present invention consisting of a piezoelectric element in which vibration produces a charge enables the simulated measurement of the same type of vibration that is set up in a magnetic head in sliding contact with magnetic media, making it possible to measure with ease and accuracy such vibration occuring even in the magnetic heads used in recording/reproduction systems which are complex in structure such as helical scanning type videotape recorder systems.

We claim:

1. A vibration measurement head for simulated measurement of vibration produced by the sliding contact between a magnetic head and magnetic recording media comprising a piezoelectric element formed in a shape that is virtually identical to that of said magnetic head and a pair of electrodes provided on said piezoelectric element.

* * * * *